US010718972B2

(12) United States Patent
Zhang

(10) Patent No.: US 10,718,972 B2
(45) Date of Patent: Jul. 21, 2020

(54) BACKLIGHT SOURCE AND MANUFACTURING METHOD THEREOF, DISPLAY SUBSTRATE, DISPLAY DEVICE AND DISPLAY METHOD THEREOF

(71) Applicant: BOE TECHNOLOGY GROUP CO., LTD., Beijing (CN)

(72) Inventor: Can Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 229 days.

(21) Appl. No.: 15/572,984

(22) PCT Filed: May 4, 2017

(86) PCT No.: PCT/CN2017/083041
§ 371 (c)(1),
(2) Date: Nov. 9, 2017

(87) PCT Pub. No.: WO2017/198074
PCT Pub. Date: Nov. 23, 2017

(65) Prior Publication Data
US 2018/0239192 A1    Aug. 23, 2018

(30) Foreign Application Priority Data

May 20, 2016  (CN) .......................... 2016 1 0342096

(51) Int. Cl.
G02F 1/13357    (2006.01)
G02B 6/00    (2006.01)
G02B 30/26    (2020.01)

(52) U.S. Cl.
CPC ......... *G02F 1/133603* (2013.01); *G02B 6/00* (2013.01); *G02B 30/26* (2020.01); *G02F 1/133605* (2013.01); *G02F 1/133608* (2013.01)

(58) Field of Classification Search
CPC ......... G02F 1/133603; G02F 1/133605; G02F 1/133606; G02B 27/225; G02B 27/2214; H01L 51/5036; H01L 27/3209
See application file for complete search history.

(56) References Cited

U.S. PATENT DOCUMENTS

2008/0122815 A1    5/2008  Son
2008/0180602 A1    7/2008  Hamamoto
(Continued)

FOREIGN PATENT DOCUMENTS

CN    101119606 A    6/2008
CN    101546058 A    9/2009
(Continued)

OTHER PUBLICATIONS

Machine translation of Xu, CN 104763950A, published Jul. 8, 2015 (Year: 2015).*
(Continued)

*Primary Examiner* — William N Harris
(74) *Attorney, Agent, or Firm* — Dilworth & Barrese, LLP.; Michael J. Musella, Esq.

(57) ABSTRACT

Disclosed are a backlight source and a manufacturing method thereof, a display substrate, a display device and a display method thereof. The backlight source includes a base substrate; a partition layer, disposed on the base substrate and including a plurality of partition portions which are disposed at intervals along a direction parallel to the base substrate; a plurality of first light emitting components, respectively disposed between the plurality of partition portions along the direction parallel to the base substrate; and a plurality of second light emitting components, disposed at intervals with the plurality of first light emitting components, and respectively disposed on the plurality of partition portions.

19 Claims, 5 Drawing Sheets

(56) References Cited

U.S. PATENT DOCUMENTS

| | | |
|---|---|---|
| 2009/0167991 A1 | 7/2009 | Young et al. |
| 2011/0068330 A1* | 3/2011 | Akimoto ............... H01L 25/048 257/40 |
| 2012/0314144 A1 | 12/2012 | Sugita |
| 2014/0016301 A1* | 1/2014 | Brown Elliott ... G02F 1/133603 362/97.1 |
| 2014/0333678 A1 | 11/2014 | Kim et al. |
| 2015/0021634 A1* | 1/2015 | Ishihara ............. H01L 25/0753 257/88 |
| 2015/0109666 A1 | 4/2015 | Wei et al. |
| 2016/0291335 A1 | 10/2016 | Wu et al. |
| 2016/0301027 A1 | 10/2016 | Wang et al. |
| 2016/0329381 A1 | 11/2016 | Xu et al. |
| 2017/0237826 A1 | 8/2017 | Wu |
| 2017/0302617 A1 | 10/2017 | Wu |
| 2018/0062100 A1* | 3/2018 | Xu ...................... H01L 27/3209 |
| 2018/0284465 A1* | 10/2018 | Kwon ................. H01L 27/3258 |

FOREIGN PATENT DOCUMENTS

| | | |
|---|---|---|
| CN | 102819147 A | 12/2012 |
| CN | 103105680 A | 5/2013 |
| CN | 103107180 A | 5/2013 |
| CN | 103454807 A | 12/2013 |
| CN | 103855193 A | 6/2014 |
| CN | 104238231 A | 12/2014 |
| CN | 104297931 A | 1/2015 |
| CN | 104297968 A | 1/2015 |
| CN | 104763950 A | 7/2015 |
| CN | 104765157 A | 7/2015 |
| CN | 104796922 A | 7/2015 |
| CN | 105050028 A | 11/2015 |
| CN | 105116650 A | 12/2015 |
| CN | 105572893 A | 5/2016 |
| CN | 104849869 A | 8/2016 |
| CN | 105929597 A | 9/2016 |

OTHER PUBLICATIONS

First Chinese Office Action dated Sep. 5, 2018.
Second Chinese Office Action dated Jan. 25, 2019.
International Search Report dated Jul. 27, 2017.

* cited by examiner

BACKLIGHT SOURCE AND MANUFACTURING METHOD THEREOF, DISPLAY SUBSTRATE, DISPLAY DEVICE AND DISPLAY METHOD THEREOF

TECHNICAL FIELD

Embodiments of the present invention relate to a backlight source and a manufacturing method thereof, a display substrate, a display device and a display method thereof.

BACKGROUND 3D (Three Dimension) display is a research hotspot in the display technical field. The basic principle of 3D display is: two eyes of a viewer see images of different view angles, and the images separately entering the left eye and the right eye have parallax, then the brain of the viewer will combine the images having parallax into a 3D image.

SUMMARY

At least one embodiment of the present invention provides a backlight source and a manufacturing method, a display substrate, a display device and a display method thereof, so as to reduce the power consumption of a display device upon 3D display being performed.

At least one embodiment of the present invention provides a backlight source, including: a base substrate; a partition layer, which is located on the base substrate and includes a plurality of partition portions disposed at intervals along a direction parallel to the base substrate; a plurality of first light emitting components, which are disposed between the partition portions along the direction parallel to the base substrate; and a plurality of second light emitting components, which are disposed at intervals with the plurality of first light emitting components, and respectively located at a side of the partition portions away from the base substrate.

For example, a distance from a top end of each of the partition portions to the base substrate is larger than a distance from a top end of each of the first light emitting components to the base substrate.

For example, along the direction parallel to the base substrate, a width of a top end of each of the partition portions is larger than a width of its bottom end.

For example, a material of the partition layer includes a light absorbing material.

For example, a material of the partition layer includes negative photoresist.

For example, the partition layer includes a first sub partition layer and a second sub partition layer. The first sub partition layer includes a plurality of first sub partition portions which are disposed at intervals; the second sub partition layer is stacked on a side of the first sub partition layers away from the base substrate, and includes a plurality of second sub partition portions which are disposed at intervals and correspond to the plurality of first sub partition portions, the plurality of first sub partition portions and the plurality of second sub partition portions form the plurality of partition portions.

For example, a width of a top end of each of the first partition portions is larger than or equal to a width of a bottom end of the corresponding second sub partition portion.

For example, along the direction parallel to the base substrate, a width of each of the second sub partition portion is larger than a width of its bottom end.

For example, a material of the second sub partition layer includes a light absorbing material.

For example, a material of the second sub partition layer includes negative photoresist.

For example, each of the first light emitting components includes a first light emitting unit and a second light emitting unit which are sequentially disposed along a direction perpendicular to the base substrate, the first light emitting unit is disposed between the second light emitting unit and the base substrate.

For example, the first light emitting unit and the second light emitting unit included in each of the first light emitting components share a same electrode.

For example, each of the second light emitting components includes a plurality of light emitting units which are stacked.

For example, a side of the first light emitting components or the second light emitting components close to the base substrate includes a reflective layer.

At least one embodiment of the present invention further provides a display substrate, which includes: a base substrate; a partition layer, which is disposed on the base substrate and includes a plurality of partition portions which are disposed at intervals along a direction parallel to the base substrate; a plurality of first light emitting components, which are respectively disposed between the plurality of partition portions along the direction parallel to the base substrate; and a plurality of second light emitting components, which are disposed at intervals with the first light emitting components and located at a side of the plurality of partition portions away from the base substrate.

At least one embodiment of the present invention further provides a display device, including a display panel and any one of the abovementioned backlight sources, the display panel is at least partially disposed in an irradiating region of the backlight source; or the display device includes the abovementioned display substrate.

For example, the display device further includes a driving element, the driving element is electrically connected with the first light emitting components and the second light emitting components.

For example, the driving element is configured to apply a driving signal to the first light emitting components or the second light emitting components, so as to correspondingly control the first light emitting components or the second light emitting components to emit light.

For example, the driving element is configured to apply a driving signal to the first light emitting components and the second light emitting components, so as to control the first light emitting components and the second light emitting components to simultaneously emit light.

For example, the display panel includes a pixel array, the pixel array includes a plurality of sub pixel columns and a plurality of sub pixel rows, the plurality of partition portions are arranged in a row direction of the pixel array; and the adjacent partition portions are provided with one or a plurality of sub pixels along the row direction.

At least one embodiment of the present invention further provides a display method of any one of the abovementioned display device, the method includes: controlling the plurality of first light emitting components included in the backlight source to emit light and the plurality of second light emitting components included in the backlight source not to emit light, or controlling the plurality of first light emitting components included in the backlight source not to emit light and the plurality of second light emitting components included in the backlight source to emit light, so as to realize 3D display; or controlling the plurality of first light emitting components included in the display substrate to emit light and the plurality of second light emitting components not to emit light, so as to realize 3D display.

For example, the display method further includes: controlling the plurality of first light emitting components and the plurality of second light emitting components which are included in the backlight source to simultaneously emit light, so as to realize 2D display; or controlling the plurality of first light emitting components and the plurality of second light emitting components which are included in the display substrate to simultaneously emit light, so as to realize 2D display.

At least one embodiment of the present invention further provides a manufacturing method of a backlight source, the method includes: forming a partition layer on a base substrate, to make the partition layer include a plurality of partition portions which are disposed at intervals along a direction parallel to the base substrate; forming a plurality of first light emitting components on the base substrate, to form the plurality of first light emitting components respectively between the plurality of partition portions along the direction parallel to the base substrate; and forming a plurality of second light emitting components on the base substrate, to dispose the plurality of second light emitting components at intervals with the plurality of first light emitting components, and at a side of the plurality of partition portions away from the base substrate.

For example, forming the plurality of first light emitting components and the plurality of second light emitting components includes: forming a first electrode layer, a light emitting function layer covering the first electrode layer, and a second electrode layer covering the light emitting function layer to form a plurality of light emitting units which are disposed at intervals, the plurality of light emitting units include light emitting units respectively disposed between the partition portions and light emitting units disposed on the partition portions. In the method, the plurality of first light emitting components respectively include the light emitting units respectively disposed between the partition portions, the plurality of second light emitting components respectively include a plurality of light emitting units respectively disposed on the partition portions.

For example, forming the partition layer includes: forming a first sub partition layer, the first sub partition layer includes a plurality of first sub partition portions which are disposed at intervals along the direction parallel to the base substrate; and forming a second sub partition layer on the first sub partition layer, to allow the second sub partition layer to include a plurality of second sub partition portions which are disposed at intervals and correspond to the plurality of first sub partition portions. In the method, the partition layer includes the first sub partition layer and the second partition layer.

Embodiments of the present invention provide a backlight source and manufacturing method thereof, display substrate, display device and display method thereof. In the embodiments of the present invention, the first light emitting components are disposed between the adjacent partition portions of the backlight source, and the second light emitting components are disposed on the partition portions of the light source, a display device employing the backlight source can realize 3D display by controlling one kind of the first light emitting components and the second light emitting components to emit light and the other kind of the first light emitting components and the second light emitting components not to emit light, and the power consumption of the display device can be reduced upon 3D display being performed. At another aspect, the embodiments of the present invention can realize the conversion between 2D display and 3D display.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention, not limitative to the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the disclosure. Based on the described embodiments herein, one person skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present invention belongs. The terms "first," "second," and so on which are used in the description and the claims of the present application for invention, are not intended to indicate any sequence, amount or importance, but distinguish various components. The terms "includes," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
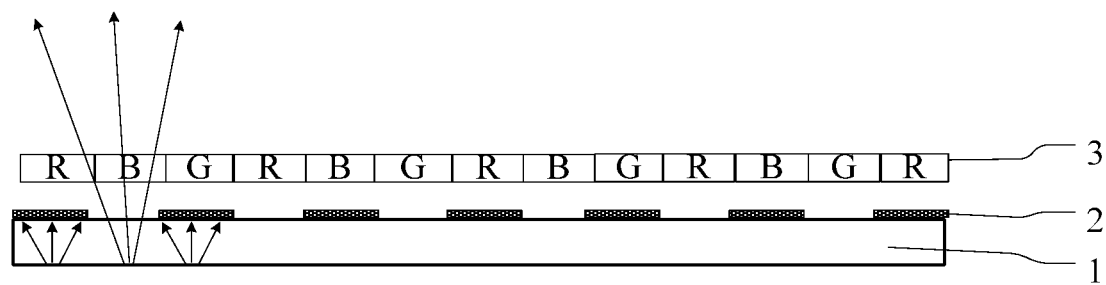
FIG. 1 is a schematic diagram of a 3D display mode.

A usual 3D display mode is realized through a parallax barrier. For example, as illustrated by FIG. 1, a slit grating 2 can be disposed in front of a backlight source 1 of a display device, so as to separate light emitted from the backlight source 1 to two directions; in this way, the light emitting from the backlight source 1 respectively enter a left eye and a right eye of a viewer after passing through a pixel array 3 (for example, including a red sub pixel R, a green sub pixel R, and a blue sub pixel B) of the display device, to generate binocular parallax. However, a large part of the backlight is lost in this 3D display mode, as a result, power consumption of the display device is relatively high upon 3D display being performed.

Embodiments of the present invention provide a backlight source and a manufacturing method thereof, a display substrate, a display device and a display method thereof. In the embodiments of the present invention, first light emitting components are disposed between the adjacent partition portions of the backlight source, and second light emitting components are disposed on the partition portion, a display device employing the backlight source can realize 3D display by controlling one kind of the first light emitting components and the second light emitting components to emit light and the other kind of the first light emitting components and the second light emitting components not to emit light, and the power consumption of the display device can be reduced upon 3D display being performed.

Hereafter, the backlight source and the manufacturing method thereof, the display device and the display method thereof provided by the embodiments of the present invention will be described in detail with reference to the accompanying drawings. Thickness and shape of the film layers in the accompanying drawings do not reflect the real proportion, and the purpose is to schematically illustrate the content of the embodiments of the present invention.

Figure 2:
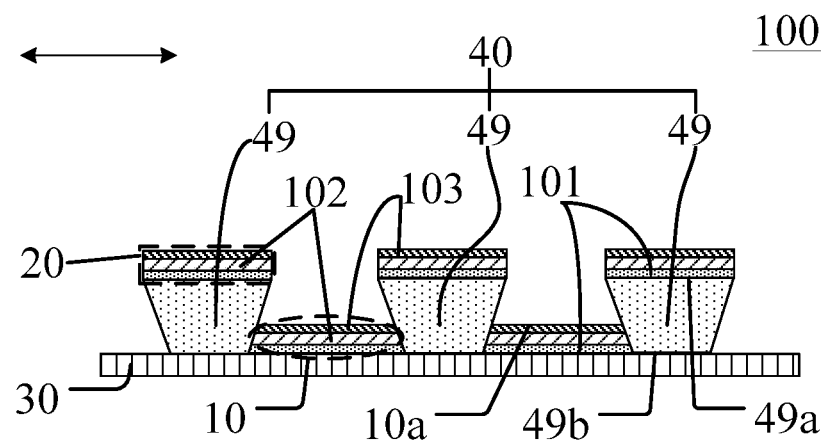
FIG. 2 is a sectional schematic diagram of a backlight source provided by an embodiment of the present invention.

As illustrated by FIG. 2, at least one embodiment of the present invention provides a backlight source 100, which includes: a base substrate 30, a partition layer 40 disposed on the base substrate 30, a plurality of first light emitting components 10 and a plurality of second light emitting components 20. The partition layer 40 includes a plurality of partition portions 49 disposed at intervals along a direction parallel to the base substrate 30 (as illustrated by the arrows in FIG. 2); the plurality of first light emitting components 10 are respectively disposed between the plurality of partition portions 49 along the direction parallel to the base substrate 30, in this way, the adjacent first light emitting components 10 are separated from each other by the partition portion 49 along the direction parallel to the base substrate 30; the plurality of second light emitting components 20 are disposed at intervals with the plurality of first light emitting components 10 and located at a side of the plurality of partition portions 49 away from the base substrate 30.

In the embodiments of the present invention, in the direction parallel to the base substrate 30, the second light emitting components 20 and the first light emitting components 10 are alternately arranged, in this way, upon one kind of the first light emitting components 10 and the second light emitting components 20 emitting light, the backlight source 100 can form a slit effect, so as to allow a display device employing the backlight source 100 to realize 3D display.

In the embodiments of the present invention, because the first light emitting components 10 disposed between the adjacent partition portions 49, a height of a light emitting surface of each of the first light emitting components 10 is smaller than that of a light emitting surface of each of the second light emitting components 20, and the partition layer 40 includes a plurality of partition portions 49, thus, in a case where the first light emitting components 10 emit light and the second light emitting components 20 do not emit light, the crosstalk between the first light emitting components 10 can be reduced to acquire a better slit effect, so as to acquire a better 3D display effect.

In the embodiments of the present invention, in a case where the first light emitting components 10 and the second light emitting components 20 simultaneously emit light, the display device employing the backlight source 100 can realize 2D display, thus, the backlight source provided by the embodiments of the present invention enables the display device to realize the conversion of 2D/3D display.

Because the partition layer 40 includes a plurality of partition portions 49 which are disposed at intervals, thus, in some embodiments, the first light emitting components 10 and the second light emitting components 20 can be synchronously manufactured, so as to reduce the manufacturing processes.

For example, the first light emitting components 10 and the second light emitting components 20 can be OLED (organic light emitting diode) light emitting elements or LED (light emitting diode) light emitting elements, in this case, both the first light emitting components and the second light emitting components include a light emitting layer and electrodes disposed at two sides of the light emitting layer. For example, the manufacturing processes of the first light emitting components 10 and the second light emitting components 20 can include: as illustrated by FIG. 2, sequentially forming a first electrode layer 101, a light emitting function layer 102 and a second electrode layer 103 between the partition portions 49 and on the partition portions 49, and the first light emitting components 10 and the second light emitting components 20 can be formed by breaking these layer structures at the edge of the partition portions 49.

For example, a side of the first light emitting components 10 or the second light emitting components 20 close to the base substrate 30 may include a reflective layer, that is to say, the first light emitting components or the second light emitting components may have a top emitting structure. For example, an electrode of each of the first light emitting components or the second light emitting component close to the base substrate 30 (as illustrated by 101 in FIG. 2) can be made of a metal material, so as to form the abovementioned reflective layer. By disposing a reflective layer, the light emitting efficiency of the first light emitting components or the second light emitting components can be improved, so as to further reduce the power consumption.

For example, a distance from a top end 49a (i.e., an end away from the base substrate 30) of each of the partition portions 49 to the base substrate 30 may be larger than a distance from a top end 10a of each of the first light emitting components 10 to the base substrate 30. By disposing the top end 49a of the partition portion 49 higher than the top end 10a of the first light emitting component 10, at an aspect, it is convenient to separate the adjacent first light emitting components and the second light emitting components upon manufacturing the first light emitting components and the second light emitting components, at another aspect, the partition portions 49 can block a part of light emitted by the first light emitting components upon the first light emitting components 10 emitting light and the second light emitting components 20 not emitting light to realize 3D display, so as to reduce the crosstalk between the adjacent first light emitting components 10, so as to acquire a better 3D display effect.

For example, along the direction parallel to the base substrate 30, a width of the top end 49a of each of the partition portions 49 can be larger than that of a bottom end 49b (an end close to the base substrate 30) of each of the partition portions 49; in this case, a cross section of each of the partition portions 49 has an inverted trapezoid shape. By forming a cross section with an inverted trapezoid shape, at an aspect, it is convenient to separate the adjacent first light emitting component and the second light emitting component upon manufacturing the first light emitting components and the second light emitting components, at another aspect, the crosstalk can be further reduced upon the first light emitting components 10 being used to realize 3D display.

In order to conveniently form a cross section with an inverted trapezoid shape during the manufacturing processes, for example, a material of the partition layer 40 can include negative photoresist.

For example, the material of the partition layer 40 can include a light absorbing material, for example, negative photoresist with light absorbing performance (for example, black negative photoresist). In this way, in a case where the first light emitting components 10 emit light and the second light emitting components 20 do not emit light to realize 3D display, the crosstalk can be further reduced.

Figure 3:
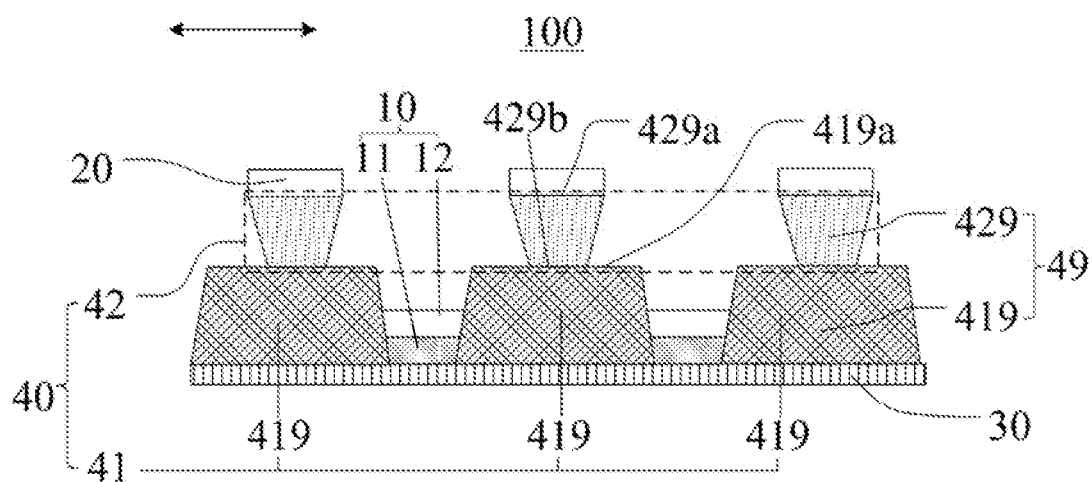
FIG. 3 is another sectional schematic diagram of a backlight source provided by an embodiment of the present invention.

FIG. 2 illustrates an example where the partition layer 40 has a single layer structure. Certainly, the partition layer 40 can have a multiple layer structure, so as to reduce the manufacturing difficulty of the partition layer 40. For example, as illustrated by FIG. 3, the partition layer 40 can include a first sub partition layer 41 and a second partition layer 42. The first partition layer 41 includes a plurality of first sub partition portions 419 which are disposed at intervals; the second sub partition layer 42 is stacked at a side of the first sub partition layer 41 away from the base substrate 30, and includes a plurality of second sub partition portions 429 which are disposed at intervals and correspond to the abovementioned plurality of first sub partition portions 419, the plurality of first sub partition portions 419 and the plurality of second partition portions 429 form the abovementioned plurality of partition portions 49.

For example, a width of a top end 419a of each of the first sub partition portions 419 can be larger than or equal to that of a bottom end 429b of the corresponding second sub partition portion 429. It is convenient for manufacturing the second sub partition portions 429.

For example, along the direction parallel to the base substrate 30 (as illustrated by arrows in FIG. 3), a width of a top end 429a of each of the second sub partition portion 429 may be larger than a width of its bottom end 429b, in this case, a cross section of each of the partition portion 49 can have an inverted trapezoid shape. By forming a cross section with an inverted trapezoid shape, at an aspect, it is convenient to separate the adjacent first light emitting component and the second light emitting component upon manufacturing the first light emitting components and the second light emitting components, at another aspect, the crosstalk can be further reduced upon the first light emitting components 10 being used to realize 3D display.

For example, In order to conveniently to make the second sub partition portion 429 form a cross section with an inverted trapezoid shape during the manufacturing process, for example, a material of the second sub partition layer 42 can include negative photoresist.

For example, the material of the second sub partition layer 42 can include a light absorbing material, for example, negative photoresist with light absorbing performance (for example, black negative photoresist). In this way, in a case where the first light emitting components 10 emit light and the second light emitting components 20 do not emit light to realize 3D display, the crosstalk can be further reduced.

Hereafter, the principle that the display device realizes 3D display upon the backlight source providing backlight to a display panel of the display device will be described with reference to FIGS. 4a and 4b.

Figure 4A:
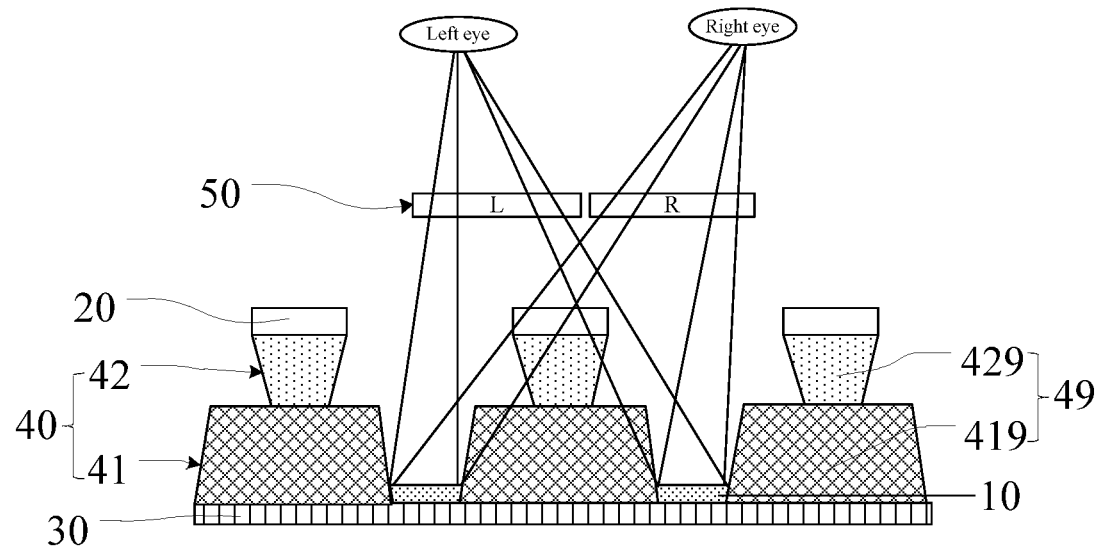
FIG. 4a is an optical path schematic diagram of a backlight source provided by an embodiment of the present invention, in which the first light emitting components emit light and the second light emitting components do not emit light, so as to realize 3D display.

For example, as illustrated by FIG. 4a, in a case where the first light emitting components 10 located between the partition portions 49 emit light and the second light emitting components 20 located on the partition portions 49 do not emit light, the positions where the partition portions 49 are located do not emit light, such that the partition layer 40 is equivalent to a slit grating, the left eye and the right eye of the viewer can see different pixel units (i.e., forming binocular parallax) after light emitted from the first light emitting components 10 passing through the pixel units of the display panel 50 (referring to L and R in FIG. 4a), so as to realize 3D display. It is to be noted that, L in FIG. 4a represents pixel units seen by the left eye of the viewer, and R in FIG. 4a represents pixel units seen by the right eye of the viewer. Besides, as illustrated by FIG. 4a, a part of the light emitted from the first light emitting component 10 of the left side used for entering the right eye of the viewer and a part of the light emitted from the first light emitting component 10 of the right side used for entering the left eye of the viewer can be blocked by the partition layer 40, thus, the crosstalk between the two first light emitting components 10 can be reduced.

Figure 4B:
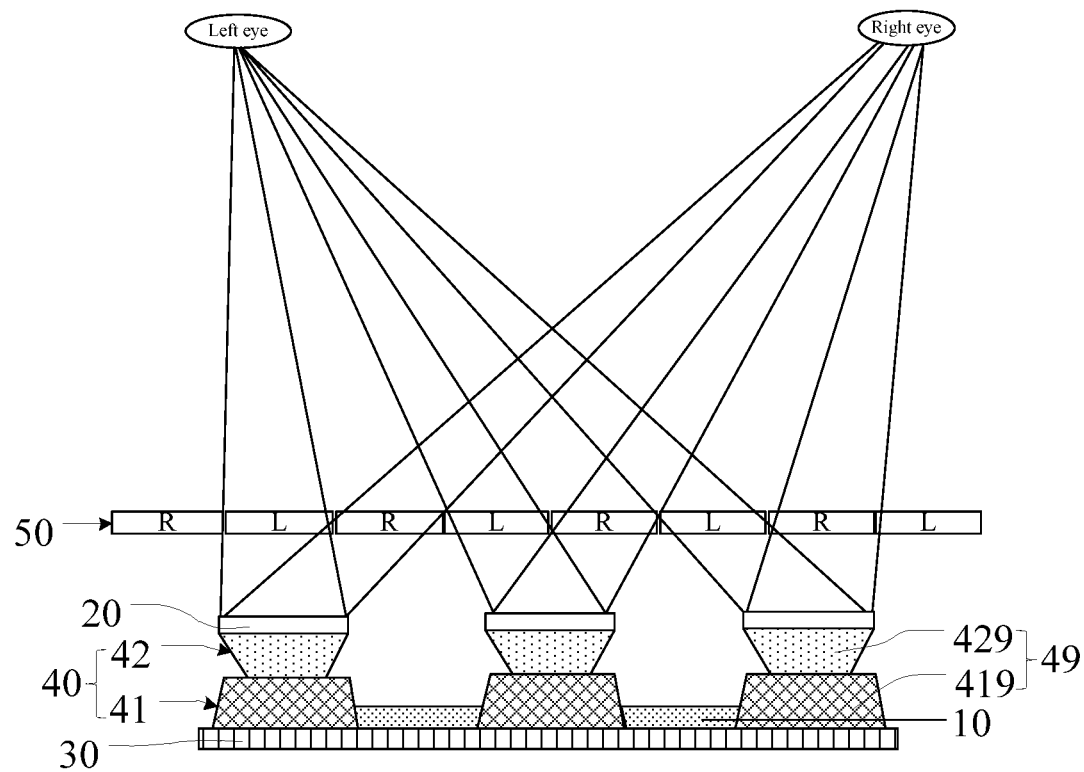
FIG. 4b is another optical path schematic diagram of a backlight source provided by an embodiment of the present invention, in which the first light emitting components do not emit light and the second light emitting components emit light, so as to realize 3D display.

For example, as illustrated by FIG. 4b, in a case where the first light emitting components 10 do not emit light and the second light emitting components 20 emit light, a region between the partition portions 49 of the partition layer 40 is a region which does not emit light, thus, the partition layer 40 can be regarded as a rear grating, so as to make the left eye and the right eye of the viewer see different pixel units after the light emitted by the second light emitting components 20 passing through the pixel units of the display panel 50, so as to realize 3D display.

In the backlight source 100 provided by at least one embodiment of the present invention, the first light emitting component 10 can include a plurality of light emitting units which are stacked together; for example, as illustrated by FIG. 3, each of the first light emitting components 10 includes a first light emitting unit 11 and a second light emitting units 12 which are sequentially disposed along a direction perpendicular to the base substrate 30, the first light emitting unit 11 is disposed between the second light emitting unit 12 and the base substrate 30. By connecting the first light emitting unit 11 and the second light emitting unit 12 in series to form the first light emitting component 10, at an aspect, the power consumption of each light emitting unit can be reduced, so as to extend the life of each light emitting unit; at another aspect, in a case where one of the light emitting units is damaged, the rest light emitting unit can still work normally, so as to improve the life and working stability of the first light emitting component.

In each of the first light emitting components 10, the first light emitting unit 11 and the second light emitting unit 12 can simultaneously emit light, or do not simultaneously emit light. For example, the first light emitting unit and the second light emitting unit can be an OLED light emitting element or a LED light emitting element, in this case, the first light emitting unit and the second light emitting unit can include a light emitting layer and electrodes located at two sides of the light emitting layer.

Figure 5A:
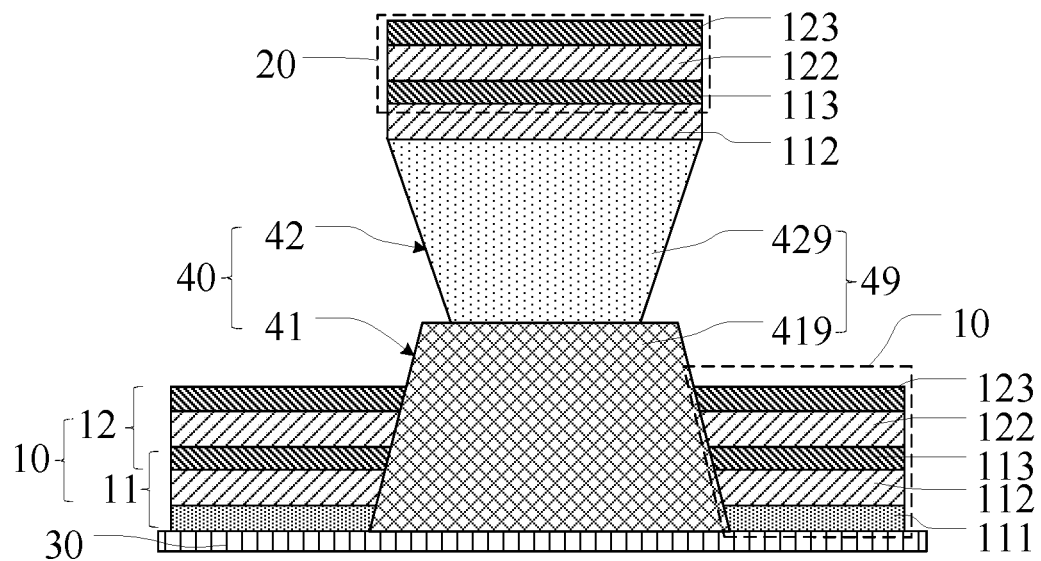
FIG. 5a is a partially enlarged schematic diagram of the backlight source illustrated by FIG. 3.

For example, in a case where each of the first light emitting components 10 includes a plurality of light emitting units which are stacked, the manufacturing process of the first light emitting components 10 can include: as illustrated by FIG. 5a, sequentially forming an electrode layer 111, a light emitting function layer 112, another electrode layer 113, another light emitting function layer 122 and another electrode layer 123, such that the electrode layer 111, the light emitting function layer 112 and the electrode 113 form the first light emitting units 11 between the adjacent partition portions 49, and the electrode layer 113, the light emitting function layer 122 and the electrode layer 123 form the second light emitting units 12 between the adjacent partition portions 49, each of the light emitting units 12 and the first light emitting unit 11 below can be connected in series to form the first light emitting component 10.

In the embodiment illustrated by FIG. 5a, the first light emitting unit 11 and the second light emitting unit 12 in each of the first light emitting components 10 share a same electrode (as illustrated by a portion of the electrode layer 113 between the partition portions 49 in FIG. 5a). In this way, the manufacturing processes of the first light emitting components can be simplified. Certainly, the first light emitting unit 11 and the second light emitting unit 12 may not share a same electrode.

In a case where the first light emitting component 10 includes a plurality of light emitting units, for example, the second light emitting component may include a single light emitting unit. For example, the signal light emitting unit can be simultaneously manufactured with any one of the light emitting units of the first light emitting component 10. For example, on the basis of the embodiment illustrated by FIG. 5a, the manufacturing process of the second light emitting components 20 can include: as illustrated by FIG. 5a, upon forming the electrode layer 113, the light emitting function layer 122 and the electrode layer 123, allowing these layer structures to include portions sequentially deposited on the partition portions 49, so as to form the second light emitting components 20. Certainly, the second light emitting components 20 can be formed by the portions of the electrode layer 111, the light emitting function layer 112 and the electrode layer 113 which are sequentially deposited on the partition portions 49; or, the second light emitting components 20 can be formed by the portions of the electrode layer 111, the light emitting layer 122 and the electrode layer 123 which are sequentially deposited on the partition portions 49. The forming method of the second light emitting components in the embodiments of the present invention includes but is not limited to these methods.

Figure 5B:
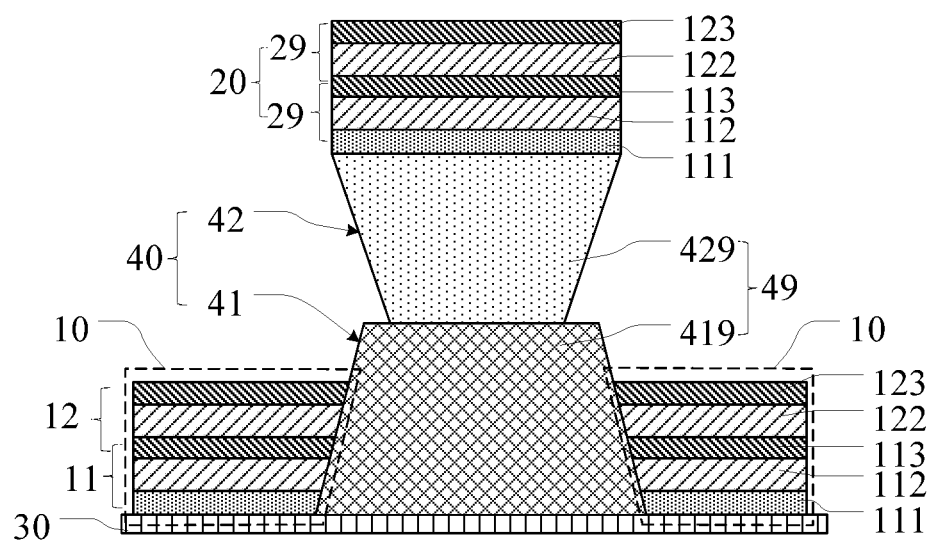
FIG. 5b is another partially enlarged schematic diagram of the backlight source illustrated by FIG. 3.

Certainly, each of the second light emitting components 20 can include a plurality of light emitting units 29 which are stacked, as illustrated by FIG. 5b, so as to improve the life and working stability of the second light emitting components 20. The manufacturing method of the second light emitting components 20 including a plurality of light emitting units can refer to the manufacturing method of the first light emitting components 10 including a plurality of light emitting units, and the repeated portions are omitted herein.

Figure 6:
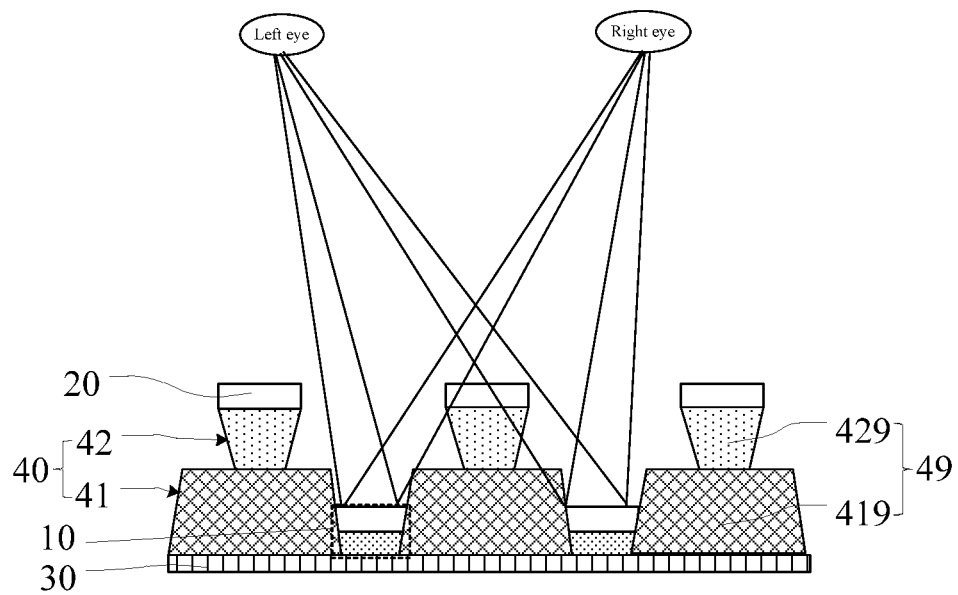
FIG. 6 is an optical path schematic diagram for realizing 3D display of a display substrate provided by an embodiment of the present invention.

At least one embodiment of the present invention further provides a display substrate, as illustrated by FIG. 6, the display substrate includes a base substrate 30, a partition layer 40 disposed on the base substrate 30, a plurality of first light emitting components 10 and a plurality of second light emitting components 20. The partition layer 40 includes a plurality of partition portions 49 which are disposed at intervals along a direction parallel to the base substrate 30 (as illustrated by the arrows in FIG. 2); the plurality of first light emitting components 10 are respectively disposed between the plurality of partition portions 49 along the direction parallel to the base substrate 30, in this way, the adjacent first light emitting components 10 are separated from each other by the partition portion 49 along the direction parallel to the base substrate 30; the plurality of second light emitting components 20 are disposed at intervals with the plurality of first light emitting components 10 and located on the plurality of partition portions 49. For example, the abovementioned display substrate may further include a plurality of thin film transistors disposed on the base substrate to respectively drive the first light emitting components and the plurality of second light emitting components to independently emit light, so as to display images. Certainly, the display substrate provided by the present embodiment may be further provided with a driving circuit and the other structures to realize displaying images, the repeated portions are omitted herein. Besides, the display substrate provided by the present embodiment is a self-luminous display substrate, for example, an OLED display substrate or quantum dot display substrate, which does not need a backlight source.

As illustrated by FIG. 6, in a case where the first light emitting components 10 located between the partition portions 49 emit light and the second light emitting components 20 located on the partition portions 49 do not emit light, the positions where the partition portions 49 are located do not emit light, such that the partition layer 40 can form a slit grating, and images seen by the left eye and right eye of the viewer have parallax, in this way, the display substrate provided by the embodiments of the present invention does not need an additional display panel to directly realize 3D display.

For example, in a case where the first light emitting components and the second light emitting components simultaneously emit light, the display substrate can realize 2D display. Thus, the display substrate provided by the embodiments of the present invention can realize the conversion between a 2D display mode and a 3D display mode.

In the display substrate provided by the embodiments of the present invention, the structures can refer to the relevant descriptions in the embodiments of the abovementioned backlight source. For example, the partition layer 40 can include the first partition layer 41 and the second partition layer 42. For example, each of the first light emitting components 10 may include a plurality of light emitting units which are stacked (as illustrated by FIG. 6), or each of the second light emitting components 20 may also include a plurality of light emitting units which are stacked, and the repeated portions are omitted herein. For example, the backlight source according to the embodiments of the disclosure refers to a planar light source. The planar light source can be used together with a display panel to display (for example, the planar light source is used as the backlight source of the display panel). Alternatively, the planar light source itself can be used as a display panel, i.e., the planar light source itself emits the image light for displaying and the planar light source itself is used as a display substrate.

Figure 7:
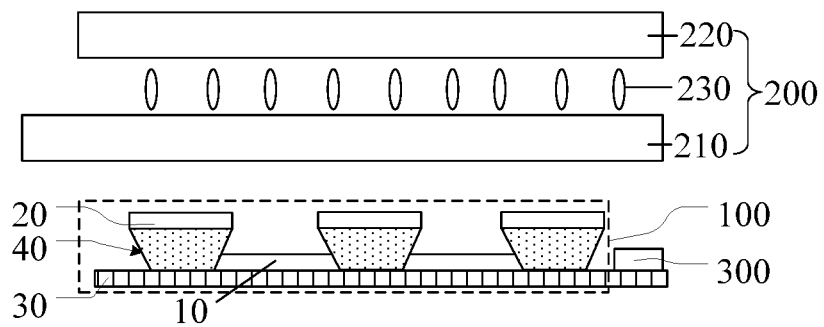
FIG. 7 is a sectional schematic diagram of a display device provided by an embodiment of the present invention.

At least one embodiment of the present invention further provides a display device, as illustrated by FIG. 7, the display device includes a display panel 200 and the backlight source 100 provided by any one of the abovementioned embodiments, the display panel 200 is at least partially disposed in an irradiating region of the backlight source 100.

At least one embodiment of the present invention further provides a display device, which includes the display substrate provided by any one of the abovementioned embodiments. For example, the display device provided by at least one embodiment of the present invention may further include a driving element 300, the driving element 300 is electrically connected with the first light emitting components 10 and the second light emitting components 20. The embodiment illustrated by FIG. 7 only illustrates an example where the driving element 300 is disposed on the base substrate 30 of the backlight source 100. Certainly, the disposing position of the driving element 300 includes but is not limited to the embodiment illustrated by FIG. 7.

For example, the driving element 300 can apply a driving signal to the first light emitting components 10 or the second light emitting components 20, so as to correspondingly control the first light emitting components 10 or the second light emitting components 20 to emit light. In a case where the display device includes a display panel 200 and a backlight source 100, the display device can realize 3D display; in a case where the display device includes the display substrate, the display device can realize 3D display by controlling the first light emitting components to emit light and the second light emitting components not to emit light.

For example, the driving element 300 can apply a driving signal to the first light emitting components 10 and the second light emitting components 20, so as to control the first light emitting components 10 and the second light emitting components 20 to simultaneously emit light. As a result, the display device can realize 2D display.

For example, the driving element 300 may be a driving IC (integrated circuit) or the other driving circuit.

FIG. 7 illustrates an example where the display device includes a display panel 200 and a backlight source 100. Certainly, in a case where the display device includes the abovementioned display substrate, the display device may also include the abovementioned driving element 300.

For example, the display panel 200 may be a liquid crystal panel, for example, the liquid crystal panel includes an array substrate 210 and an opposed substrate 220 which are disposed opposite to each other, and a liquid crystal layer 230 disposed therebetween.

Figure 8:
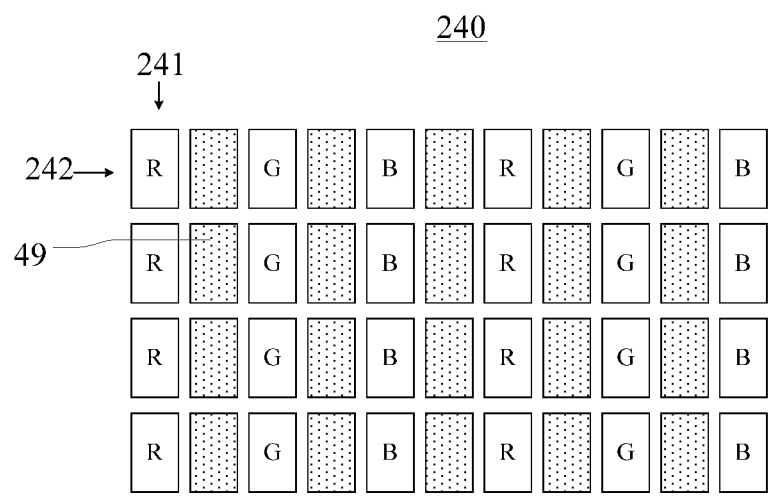
FIG. 8 is a schematic diagram of position relationship between a pixel array in a display panel and a partition layer in a display device provided by an embodiment of the present invention.

For example, as illustrated by FIG. 8, the display panel 200 includes a pixel array 240, the pixel array 240 includes a plurality of sub pixel columns 241 and a plurality of sub pixel rows 242, the plurality of partition portions 49 included in the backlight source are arranged along the row direction of the pixel array 240. In the row direction, every two adjacent partition portions 49 can be provided with a sub pixel (for example, a red sub pixel R, a green sub pixel G or a blue sub pixel B, as illustrated by FIG. 8) therebetween. Or, every two adjacent partition portions 49 may be provided with a plurality of sub pixels. By disposing the partition portions 49 in this way, the backlight source can form a slit effect upon the first light emitting components and the second light emitting components not simultaneously emitting light, and an extending direction of the slit is approximately the column direction of the pixel array, such that the light emitted from the backlight source can realize 3D display after passing through the display panel 200. For example, the display device provided by the embodiments of the present invention can be a liquid crystal display device, electronic paper, cellphone, flat plate computer, television, notebook computer, digital frame, navigator or any other product or component having a display function.

At least one embodiment of the present invention further provides a display method of a display device provided by any one of the abovementioned embodiments, in a case where the display device includes a display panel and the backlight source according to any one of the abovementioned embodiments, the method includes: controlling the plurality of first light emitting components 10 included in the backlight source 100 (as illustrated by FIG. 7) in the display device to emit light and the plurality of second light emitting components 20 included in the backlight source 100 in the display device not to emit light, or controlling the plurality of first light emitting components 10 included in the backlight source 100 not to emit light and the plurality of second light emitting components 20 to emit light, so as to make the display device realize 3D display. In a case where the display device includes the display substrate according to any one of the abovementioned embodiments, controlling the plurality of first light emitting components 10 included in the display substrate (as illustrated by FIG. 6) in the display device to emit light and the plurality of second light emitting components 20 included in the display substrate in the display device not to emit light, to make the display device realize 3D display. The method can reduce the power consumption of the display device upon 3D display being performed.

For example, the display method provided by at least one embodiment of the present invention further includes: in a case where the display device includes a display panel and the backlight source according to any one of the abovementioned embodiments, controlling the plurality of first light emitting components 10 and the plurality of second light emitting components 20 included in the backlight source 100 to simultaneously emit light. In a case where the display device includes the display substrate according to any one of the abovementioned embodiments, controlling the plurality of first light emitting components 10 and the plurality of second light emitting components 20 included in the display substrate to simultaneously emit light, so as to realize 2D display. The display method provided by the embodiments of the present invention can realize the conversion of 2D/3D display modes.

Figure 9:
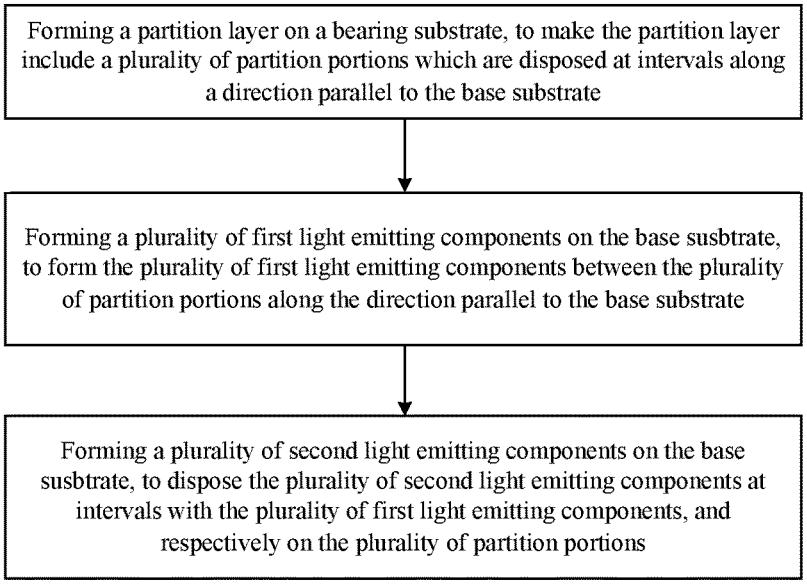
FIG. 9 is a flow diagram of a manufacturing method of a backlight source provided by an embodiment of the present invention.

At least one embodiment of the present invention provides a manufacturing method of a backlight source, as illustrated by FIG. 9, the method includes: forming a partition layer on a base substrate, to make the partition layer include a plurality of partition portions which are disposed at intervals along a direction parallel to the base substrate; forming a plurality of first light emitting components on the base substrate, to form the plurality of first light emitting components between the plurality of partition portions along the direction parallel to the base substrate; and forming a plurality of second light emitting components on the base substrate, to dispose the plurality of second light emitting components at intervals with the plurality of first light emitting components, and at a side of the plurality of partition portions away from the base substrate.

The method provided by the embodiments of the present invention can be adopted to manufacture the backlight source 100 according to any one of the abovementioned embodiments. Besides, the backlight source manufactured by the method provided by the embodiments of the present invention can serve as the display substrate according to any one of the abovementioned embodiments.

For example, taking the backlight source 100 illustrated by FIG. 2 as an example, in the method provided by at least one embodiment of the present invention, forming a plurality of first light emitting components 10 and a plurality of second light emitting components 20 includes: forming a first electrode layer 101, a light emitting function layer 102 covering the first electrode layer 101 and a second electrode layer 103 covering the light emitting function layer 102 on the base substrate 30 to form a plurality of light emitting units which are separated from each other, the plurality of light emitting units include a plurality of light emitting units which are respectively disposed between the partition portions 49 and a plurality of light emitting units disposed on the partition portions 49, the plurality of first light emitting components 10 respectively include the light emitting units which are respectively disposed between the partition portions 49, and the plurality of second light emitting components 20 respectively include the light emitting units which are respectively disposed on the partition portions 49.

For example, the light emitting units formed by the first electrode layer 101, the light emitting function layer 102 and the second electrode layer 103 can be OLED light emitting elements or LED light emitting elements.

For example, taking the backlight source 100 illustrated by FIG. 3 as an example, in the method provided by at least one embodiment of the present invention, forming the partition layer 40 may include: forming a first sub partition layer 41, to make the first sub partition layer 41 include a plurality of first partition portions 419 which are disposed at intervals along the direction parallel to the base substrate 30; and forming a second sub partition layer 42 on the first sub partition layer 41, to make the second partition layer 42 include a plurality of second sub partition portions 429 which are disposed at intervals and correspond to the plurality of first sub partition portions 419. Therefore, the partition layer 40 includes a first sub partition layer 41 and a second sub partition layer 42.

Hereafter, the first, second light emitting components and partition layer in the backlight source illustrated by FIG. 5a will be described as an example to illustrate the manufacturing method provided by the embodiments of the present invention. For example, as illustrated by FIGS. 10a to 10b, the manufacturing method of the backlight source illustrated by FIG. 5a can include the following steps S1 to S5.

Figure 10A:
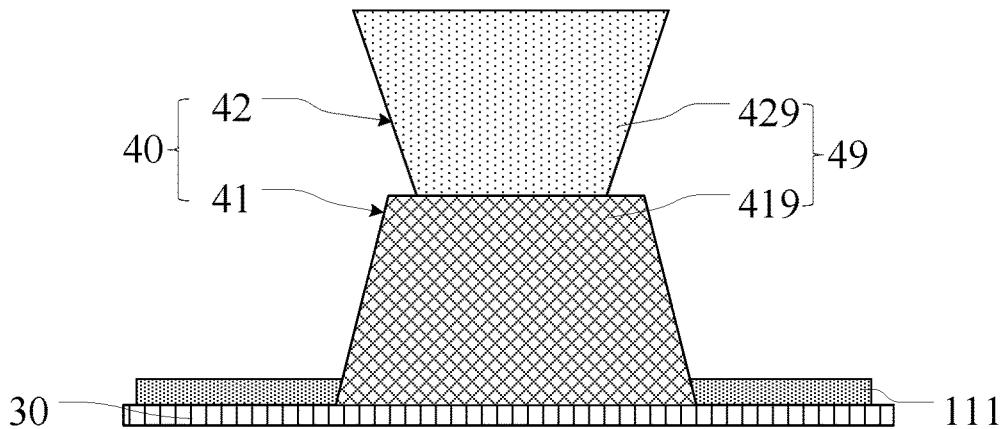
FIGS. 10a and 10b are schematic diagrams of steps in the manufacturing method of a backlight source provided by an embodiment of the present invention.
Figure 10B:
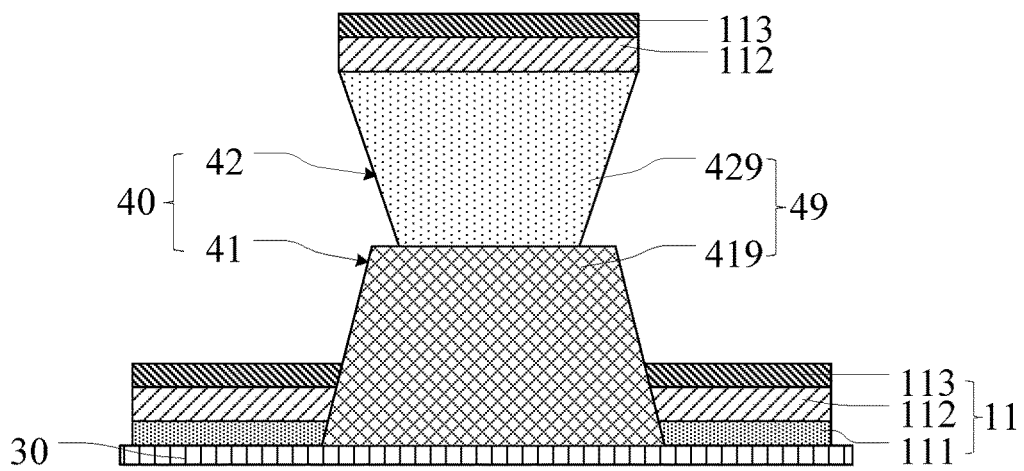

Step S1: as illustrated by FIG. 10a, forming a first sub partition layer 41 on the base substrate 30, to make the first sub partition layer 41 include a plurality of first sub partition portions 419 which are disposed at intervals (FIG. 10a only illustrated one first sub partition portion 419).

Step S2: as illustrated by 10a, forming a second sub partition layer 42 on the first sub partition layer 41, to make the second sub partition layer 42 include a plurality of second sub partition portions 429 (FIG. 10a only illustrate one second sub partition portion 429), to form the partition layer.

For example, the second sub partition layer 42 can be made of negative photoresist with light absorbing performance, to form an inverted trapezoid structure.

The heights of the first and second sub partition layers can be designed according to the practical requirements of 3D display, for example, according to the best viewing distance and the interpupillary distance of the viewer upon 3D display being performed. The repeated portions are omitted herein.

Step S3: as illustrated by FIG. 10a, after manufacturing the partition layer 40, forming an electrode layer 111 between the adjacent partition portions 49. For example, the electrode layer 111 can be made of ITO/Ag/ITO, to as to form a plurality of reflective anodes (FIG. 10a illustrates two reflective anodes).

Step S4: as illustrated by FIG. 10b, after forming the electrode layer 111, sequentially depositing a light emitting function layer 112 (for example, including a hole injection layer, a hole transport layer, a light emitting layer, an electron transport layer and an electron injection layer) and an electrode layer 113 between the partition portions 49 and on the partition portions 49, so as to obtain a first light emitting unit 11 located between the adjacent partition portions 49. For example, the electrode layer 113 can be a cathode, which can be made of a transparent metal oxide (for example, IZO, i.e., indium zinc oxide). The light emitting function layer 112 between the partition portions 49 and on the partition portions 49 can be deposited at the same time, without a mask plate, and the manufacturing processes is simpler.

Step S5: as illustrated by FIG. 5b, after forming the first light emitting unit 11, sequentially depositing a light emitting function layer 122 and an electrode layer 123 between the partition portions 49 and on the partition portions 49 according to the method in step S4, such that a second light emitting unit 12 can be obtained by the electrode layer 113, the light emitting function layer 122 and the electrode 123 which are located between the adjacent partition portions 49, the first light emitting unit 12 and the first light emitting unit 11 are connected in series to form a first light emitting component 10, and a second light emitting component 20 can be obtained by the electrode 113, the light emitting function layer 122 and the electrode 123 which are located on the partition portions 49.

The forgoing is exemplary embodiments of the present disclosure, and not intended to limit the scope of the present disclosure. The scope of the present disclosure should be defined by the accompanying claims.

The present application claims priority of Chinese Patent Application No. 201610342096.9 filed on May 20, 2016, the present disclosure of which is incorporated herein by reference in its entirety as part of the present application.

The invention claimed is:

1. A backlight source, comprising:
   a base substrate;
   a partition layer, disposed on the base substrate and comprising a plurality of partition portions which are disposed at intervals along a direction parallel to the base substrate;
   a plurality of first light emitting components, respectively disposed between the plurality of partition portions along the direction parallel to the base substrate; and
   a plurality of second light emitting components, disposed at intervals with the plurality of first light emitting components, and respectively disposed at a side of the plurality of partition portions away from the base substrate,
   wherein the partition layer comprises:
   a first sub partition layer, comprising a plurality of first sub partition portions which are disposed at intervals;
   a second sub partition layer, stacked on a side of the first sub partition layer away from the base substrate and comprising a plurality of second sub partition portions which are disposed at intervals and respectively correspond to the plurality of first sub partition portions, wherein the plurality of first sub partition portions and the plurality of second sub partition portions form the plurality of partition portions.

2. The backlight source according to claim 1, wherein a distance from a top end of each of the partition portions to the base substrate is larger than a distance from a top end of each of the first light emitting components to the base substrate.

3. The backlight source according to claim 1, wherein a width of a top end of each of the partition portions is larger than a width of a bottom end of each of the partition portions.

4. The backlight source according to claim 1, wherein a material of the partition layer comprises a light absorbing material.

5. The backlight source according to claim 1, wherein a material of the partition layer comprises negative photoresist.

6. The backlight source according to claim 1, wherein a width of a top end of each of the plurality of first sub partition portions is larger than or equal to a width of a bottom end of a corresponding one of the plurality of second sub partition portions.

7. The backlight source according to claim 1, wherein a width of a top end of each of the plurality of second sub partition portions is larger than a width of the bottom end of each of the plurality of second sub partition portions.

8. The backlight source according to claim 1, wherein each of the plurality of first light emitting components comprises a first light emitting unit and a second light emitting unit which are sequentially disposed along a direction perpendicular to the base substrate, the first light emitting unit is disposed between the second light emitting unit and the base substrate.

9. The backlight source according to claim 8, wherein the first light emitting unit and the second light emitting unit included in each of the plurality of first light emitting components share a same electrode.

10. The backlight source according claim 1, wherein each of the plurality of second light emitting components comprises a plurality of light emitting units which are stacked.

11. The backlight source according to claim 1, wherein a side of the plurality of first light emitting components or the plurality of second light emitting components close to the base substrate has a reflective layer.

12. A display substrate, comprising:
a base substrate;
a partition layer, disposed on the base substrate and comprising a plurality of partition portions which are disposed at intervals along a direction parallel to the base substrate;
a plurality of first light emitting components, respectively disposed between the plurality of partition portions along the direction parallel to the base substrate; and
a plurality of second light emitting components, disposed at intervals with the plurality of first light emitting components, and respectively disposed at a side of the plurality of partition portions away from the base substrate,
wherein the partition layer comprises:
a first sub partition layer, comprising a plurality of first sub partition portions which are disposed at intervals;
a second sub partition layer, stacked on a side of the first sub partition layer away from the base substrate and comprising a plurality of second sub partition portions which are disposed at intervals and respectively correspond to the plurality of first sub partition portions, wherein the plurality of first sub partition portions and the plurality of second sub partition portions form the plurality of partition portions.

13. A display device, comprising:
a display panel and the backlight source according to claim 1, wherein the display panel is at least partially located in an irradiating region of the backlight source.

14. The display device according to claim 13, further comprising:
a driving element, electrically connected with the plurality of first light emitting components and the plurality of the second light emitting components;
wherein the driving element is configured to apply a driving signal to the plurality of first light emitting components or the plurality of second light emitting components, so as to correspondingly control the plurality of first light emitting components or the plurality of second light emitting components to emit light; or the driving element is configured to apply a driving signal to the plurality of first light emitting components and the plurality of second light emitting components, so as to control the plurality of first light emitting components and the plurality of second light emitting components to simultaneously emit light.

15. The display device according to claim 13, wherein the display panel comprises a pixel array, the pixel array comprises a plurality of sub pixel columns and a plurality of sub pixel rows, the plurality of partition portions are arranged along a row direction of the pixel array; and adjacent ones of the plurality of partition portions are provided with one or a plurality of sub pixels of the pixel array along the row direction.

16. A display device, comprising:
the display substrate according to claim 12; and
a driving element, electrically connected with the plurality of first light emitting components and the plurality of the second light emitting components.

17. The display device according to claim 16, wherein the driving element is configured to apply a driving signal to the plurality of first light emitting components or the plurality of second light emitting components, so as to correspondingly control the plurality of first light emitting components or the plurality of second light emitting components to emit light; or the driving element is configured to apply a driving signal to the plurality of first light emitting components and the plurality of second light emitting components, so as to control the plurality of first light emitting components and the plurality of second light emitting components to simultaneously emit light.

18. A display method of the display device according to claim 13, comprising:
controlling the plurality of first light emitting components included in the backlight source to emit light and the plurality of second light emitting components included in the backlight source not to emit light, or controlling the plurality of first light emitting components included in the backlight source not to emit light and the plurality of second light emitting components included in the backlight source to emit light, so as to realize 3D display; and/or
controlling the plurality of first light emitting components and the plurality of second light emitting components which are included in the backlight source to simultaneously emit light, so as to realize 2D display.

19. A display method of the display device according to claim 16, comprising:

controlling the plurality of first light emitting components included in the display substrate to emit light and the plurality of second light emitting components included in the display substrate not to emit light, so as to realize 3D display; and/or controlling the plurality of first light emitting components and the plurality of second light emitting components which are included in the display substrate to simultaneously emit light, so as to realize 2D display.

* * * * *